(12) United States Patent
Ferren et al.

(10) Patent No.: US 10,989,833 B2
(45) Date of Patent: Apr. 27, 2021

(54) SYSTEMS AND METHODS FOR MONITORING GRAIN LOSS

(71) Applicant: Deere & Company, Moline, IL (US)

(72) Inventors: Bran Ferren, Beverly Hills, CA (US); Donald Lariviere, Glendale, CA (US); Robert Liebersbach, Glendale, CA (US); Houstin Lichtenwalner, Macungie, PA (US); Colton O'Connor, Los Angeles, CA (US); Omar Peraza, Canyon Country, CA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/581,089

(22) Filed: Sep. 24, 2019

(65) Prior Publication Data

US 2021/0088691 A1 Mar. 25, 2021

(51) Int. Cl.
| | |
|---|---|
| *G01V 11/00* | (2006.01) |
| *H04N 5/247* | (2006.01) |
| *H04N 5/225* | (2006.01) |
| *G06T 7/00* | (2017.01) |
| *G06T 7/13* | (2017.01) |
| *A01D 41/127* | (2006.01) |
| *G06T 5/00* | (2006.01) |

(52) U.S. Cl.
CPC .......... *G01V 11/00* (2013.01); *A01D 41/1273* (2013.01); *G06T 5/002* (2013.01); *G06T 7/0004* (2013.01); *G06T 7/13* (2017.01); *H04N 5/2256* (2013.01); *H04N 5/247* (2013.01); *G06T 2207/30188* (2013.01); *G06T 2207/30242* (2013.01)

(58) Field of Classification Search
CPC ...... H04N 5/2256; H04N 2/247; G01V 11/00; G06T 7/13; G06T 5/002; G06T 7/0004; G06T 2207/30188; G06T 2207/30242; A01D 41/1273
See application file for complete search history.

(56) References Cited

U.S. PATENT DOCUMENTS 9,516,817 B2 12/2016 Temple et al.
9,779,330 B2 10/2017 Wellington et al.
(Continued)

FOREIGN PATENT DOCUMENTS

WO 2013012080 A1 1/2013

*Primary Examiner* — Maria E Vazquez Colon
(74) *Attorney, Agent, or Firm* — Klintworth & Rozenblat IP LLP

(57) ABSTRACT

A sensor apparatus is provided for a grain loss monitoring system associated with an agricultural material. The sensor apparatus includes a housing with a first wall including a transparent panel. The sensor apparatus includes at least one acoustic sensor arranged within the interior and configured to collect an acoustic data stream of vibrations associated with the agricultural material striking the transparent panel; and at least one optical sensor arranged within the interior and configured to collect an image data stream of images of the agricultural material through the transparent panel. The at least one acoustic sensor is configured to provide the acoustic data stream and the at least one optical sensor is configured to provide the image data stream such that a verified grain count is determined based on the acoustic data stream and the image data stream.

20 Claims, 10 Drawing Sheets

(56) References Cited

U.S. PATENT DOCUMENTS

| | | |
|---|---|---|
| 9,901,031 B2 | 2/2018 | Mott et al. |
| 2004/0031335 A1* | 2/2004 | Fromme ................ G01B 11/24 |
| | | 73/865 |
| 2012/0004815 A1 | 1/2012 | Behnke |
| 2015/0370935 A1* | 12/2015 | Starr ...................... G06Q 50/02 |
| | | 703/11 |
| 2017/0094901 A1 | 4/2017 | French, Jr. et al. |
| 2017/0112057 A1* | 4/2017 | Loukili .............. G06K 9/00791 |
| 2018/0000011 A1* | 1/2018 | Schleusner ........... G06T 7/0004 |
| 2018/0106709 A1* | 4/2018 | Cherney ................ G01F 22/00 |
| 2019/0073759 A1 | 3/2019 | Hadar et al. |

* cited by examiner

SYSTEMS AND METHODS FOR MONITORING GRAIN LOSS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to agricultural harvesting machines, such as combine harvesters, and more specifically to systems for improving harvesting operations.

BACKGROUND OF THE DISCLOSURE

Agricultural harvesting machines include headers designed to cut and collect crops from the ground. In a combine harvester, the harvesting machine threshes the crops, separates the grain from other material, cleans the grain, stores the grain in a grain tank, and eventually, transfers the grain from the grain tank to an accompanying vehicle such as a grain cart or grain wagon. In a forage harvester, the crop is cut, accelerated, and blown into a container of a transport vehicle; and in a windrower, the crop is cut and deposited on a field in a swath. It is common for such harvesting equipment to include loss sensors that sense some type of metric indicative of the amount of the harvested crop being lost during the harvesting operation.

SUMMARY OF THE DISCLOSURE

The disclosure provides a harvester system and method for monitoring grain loss.

In one aspect, the disclosure provides a sensor apparatus for a grain loss monitoring system associated with an agricultural material. The sensor apparatus includes a housing with a plurality of walls forming an interior. The plurality of walls includes at least one first wall including a transparent panel with an inner surface facing the interior and an outer surface facing opposite the inner surface. The sensor apparatus further includes at least one acoustic sensor arranged within the interior of the housing and configured to collect an acoustic data stream of vibrations associated with the agricultural material striking the transparent panel; and at least one optical sensor arranged within the interior of the housing and configured to collect an image data stream of images of the agricultural material through the transparent panel. The at least one acoustic sensor is configured to provide the acoustic data stream and the at least one optical sensor is configured to provide the image data stream such that a verified grain count is determined based on the acoustic data stream and the image data stream.

In another aspect, the disclosure provides a grain loss monitoring system for a harvesting machine configured to process agricultural material. The grain loss monitoring system includes a sensor apparatus with a housing with a plurality of walls forming an interior. The plurality of walls includes at least one first wall including a transparent panel with an inner surface facing the interior and an outer surface facing opposite the inner surface. The sensor apparatus further includes at least one acoustic sensor arranged within the interior of the housing and configured to collect an acoustic data stream associated with the agricultural material striking the transparent panel and at least one optical sensor arranged within the interior of the housing and configured to collect an image data stream of images of the agricultural material through the transparent panel. The grain loss monitoring system further includes a controller coupled to receive the image data stream and the acoustic data stream, the controller configured to determine an acoustic-based grain count from the acoustic data stream, to determine an image-based grain count from the optical data stream, and to calculate a verified count based on the acoustic-based grain count and the image-based grain count.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
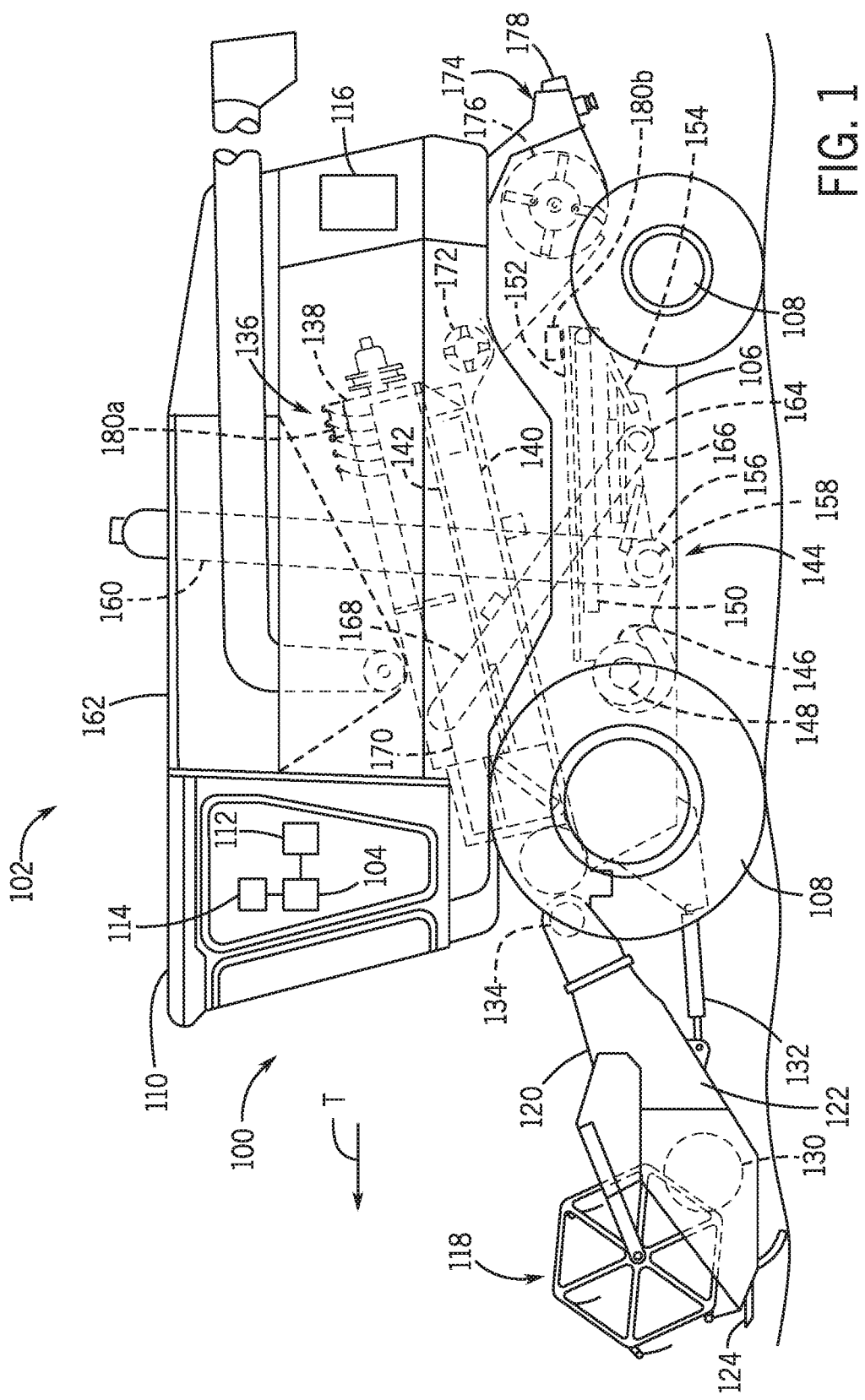
FIG. 1 is a schematic elevation view of a harvesting machine in the form of an example agricultural combine harvester that includes a grain loss monitoring system according to this disclosure.

The following describes one or more example implementations of the disclosed harvesting control system and method, as shown in the accompanying figures of the drawings described briefly above. Various modifications to the example implementations may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "forward," "front," "aft," "rear," "lateral," "horizontal," and "vertical" may be used. Such terms are defined, at least in part, with respect to the direction in which the work vehicle or implement travels during use. For example, the terms "forward" and "front" (including "fore" and any further derivatives or variations) refer to a direction corresponding to the primary direction of travel, while the term "aft" and "rear" (and derivatives and variations) refer to an opposing direction. The term "longitudinal axis" may also reference an axis extending in fore and aft directions. By comparison, the term "lateral axis" may refer to an axis that is perpendicular to the longitudinal axis and extends in a horizontal plane; that is, a plane containing both the longitudinal and lateral axes. The term "vertical," as appearing herein, refers to an axis or a direction orthogonal to the horizontal plane containing the fore-aft and lateral axes. The terms "top," "bottom," and "sides" refer to orientations relative to one another or other referenced components and not absolute orientations.

The present disclosure provides an improved grain loss monitoring system for use in agricultural combine harvesters and other harvesting machines to enhance harvester operation and enhance crop collection. The grain loss monitoring system disclosed herein may be understood to include one or more sensor apparatuses to collect information representing the amount of grain passing over or through a particular location. In one example, the sensor apparatus includes a housing that forms an interior that houses at least one optical or image sensor, at least one acoustic sensor, and one or more lighting arrays. The top wall defines an aperture filled by a transparent panel. As such, during operation, the optical sensors capture images of the agricultural material as the material impacts and/or moves over the transparent panel, thereby generating an image data stream that enables calculation of an image-based grain count. The acoustic sensor has a piezoelectric element that continuously captures force vibration data as the agricultural material contacts the transparent panel to result in a time varying amplitude waveform signal as an acoustic data stream that enables calculation of an acoustic-based grain count. Generally, the sensor apparatus may be embodied as a separator loss sensor apparatus, a cleaning shoe loss sensor apparatus, and/or any other type of grain sensor that may be utilized in the grain loss monitoring system described herein.

In various embodiments, the system determines grain count representing crop loss according to the following steps: acquiring simultaneous image and acoustic data streams; identifying an image frame from the image data; detecting an acoustic segment from the acoustic data; determining an image-based grain count from the image frame; determining an acoustic-based grain count from the acoustic data in parallel with determining the image-based grain count; verifying a grain count from the image-based grain count and the acoustic-based grain count; and displaying the verified grain count to an operator as a crop loss value.

As used herein, the term "grain" may be considered any relevant agricultural material, including seeds, corn, and the like. The term "acoustic-based grain count" refers to an estimate of the quantity of grain detected based on data from an acoustic sensor. The term "image-based grain count" refers to an estimate of the quantity of grain detected based on data from an optical or image sensor. The term "verified grain count" refers to an estimate of the quantify of grain generated by the system resulting from consideration of the acoustic-based grain count and the image-based grain count over corresponding time periods.

Referring now to FIG. 1, a grain loss monitoring system 100 may be implemented with an example agricultural combine harvester 102 or with respect to a variety of other agricultural harvesting machines (e.g., forage harvesters or windrowers). As described in greater detail below, the grain loss monitoring system 100 is at least partially embodied with a controller 104 that controls and/or facilitates operation of various aspects of the harvester 102. In some examples, the grain loss monitoring system 100 may be part of a broader harvesting evaluation system and/or a harvesting control system. Additional details about the grain loss monitoring system 100 will be provided after a brief description of the harvester 102.

As shown, the example combine harvester 102 includes a chassis 106 with ground-engaging wheels 108 or tracks. The wheels 108 are rotatably mounted to the chassis 106 and engage with the ground to propel the combine harvester 102 in a travel direction T. An operator cab 110, also mounted to the chassis 106, houses an operator as well as various devices to control the harvester 102, such as one or more operator input devices 112 and/or display devices 114, described below.

The wheels 108 and other devices of the harvester 102 are powered by an internal combustion engine 116 or other power source. As described in greater detail below, the engine 116 may be operated based on commands from the operator and/or the controller 104, including in some examples, to implement aspects of the grain loss monitoring system 100.

A header 118 is mounted at the front of the chassis 106 of the combine harvester 102 to cut and gather crop material from a field. The header 118 is supported by a feederhouse 120 pivotally mounted to the chassis 106. As described below, the header 118 includes a frame 122 supporting a cutter bar 124 that extends substantially across the length of the header 118 and that functions to cut crops along the ground. The header 118 may further include a mechanism for collecting the cut material from the cutter bar 124. In this example, the header 118 includes an auger 130 to transport the cut crop material towards the center of the header 118. Other examples may include one or more conveyors. The header 118 may include a header actuator 132 that functions to reposition the header 118 relative to the ground and/or in front and rearward directions. The feederhouse 120 may include, for example, an inclined conveyor (not shown) to transport cut crop material from the header 118 into the body of the combine harvester 102.

After passing over a guide drum or feed accelerator 134, the crop material from the feederhouse 120 reaches a generally fore-aft oriented threshing device or separator 136. Other embodiments may include laterally oriented or other threshing devices (not shown). In the embodiment depicted, the separator 136 includes a rotor 138 on which various threshing elements are mounted. The rotor 138 rotates above one or more grated or sieved threshing baskets or concaves 140, such that crop material passing between the rotor 138 and the concaves 140 is separated, at least in part, into grain and chaff (or other "material other than grain" (MOG)). The concaves 140 may be opened and/or closed with one or more concave actuators 142 (schematically shown). The concave actuators 142, as well as further actuators associated with the concaves 140, may be operated based on commands from the operator and/or the controller 104, including in some examples, to implement aspects of the grain loss monitoring system 100. The MOG is carried rearward and released from between the rotor 138 and the concaves 140. Most of the grain (and some of the MOG) separated in the separator 136 falls downward through apertures in the concaves 140.

Agricultural material passing through the concaves 140 fall (or are actively fed) into a cleaning subsystem (or cleaning shoe) 144 for further cleaning. The cleaning subsystem 144 includes a fan 146, driven by a motor 148, that generates generally rearward air flow, as well as a sieve 150 and a chaffer 152. The sieve 150 and the chaffer 152 are suspended with respect to the chassis 106 by an actuation arrangement 154 that may include pivot arms and rocker arms mounted to disks (or other devices). As the fan 146 blows air across and through the sieve 150 and the chaffer 152, the actuation arrangement 154 may cause reciprocating motion of the sieve 150 and the chaffer 152 (e.g., via movement of the rocker arms). The combination of this motion of the sieve 150 and the chaffer 152 with the air flow from the fan 146 generally causes the lighter chaff to be blown upward and rearward within the combine harvester 102, while the heavier grain falls through the sieve 150 and the chaffer 152 and accumulates in a clean grain trough 156 near the base of the combine harvester 102.

A clean grain auger 158 disposed in the clean grain trough 156 carries the material to the one side of the combine harvester 102 and deposits the grain in the lower end of a clean grain elevator 160. The clean grain lifted by the clean grain elevator 160 is carried upward until it reaches the upper exit of the clean grain elevator 160. The clean grain is then released from the clean grain elevator 160 and falls into a grain tank 162.

Most of the grain entering the cleaning subsystem 144, however, is not carried rearward, but passes downward through the chaffer 152, then through the sieve 150. Of the material carried by air from the fan 146 to the rear of the sieve 150 and the chaffer 152, smaller MOG particles are blown out of the rear of the combine harvester 102. Larger MOG particles and grain are not blown off the rear of the combine harvester 102, but rather fall off the cleaning subsystem 144.

Heavier material carried to the rear of the chaffer 152 falls out of the combine harvester 102. Heavier material carried to the rear of the sieve 150 falls onto a pan and is then conveyed by gravity downward into a grain tailings trough 164 in the form of "tailings," typically a mixture of grain and MOG. A tailings auger 166 disposed in the tailings trough 164 carries the grain tailings to the opposite side of the combine harvester 102 and into a grain tailings elevator 168. The grain tailings elevator 168 communicates with the tailings auger 166 at an inlet opening of the grain tailings elevator 168 where grain tailings are received for transport for further processing. At a top end of the tailings elevator 168, an outlet opening (or other offload location) 170 is provided (e.g., for return to the thresher).

In a passive tailings implementation, the grain tailings elevator 168 carries the grain tailings upward and deposits them on a forward end of the rotor 138 to be re-threshed and separated. The grain tailings are then received by a discharge beater 172 where the remaining kernels of grain are released. The now-separated MOG is released behind the combine harvester 102 to fall upon the ground in a windrow or are delivered to a residue subsystem 174 that can include a chopper 176 and a spreader 178 to be chopped by the chopper 176 and spread on the field by the spreader 178. Alternatively, in an active tailings implementation, the grain tailings elevator 168 may deliver the grain tailings upward to an additional threshing unit (not shown) that is separate from the separator 136 and where the grain tailings are further threshed before being delivered to the main crop flow at the front of the cleaning subsystem 144.

As described below, the harvester 102 may include a number of sensors in communication with the controller 104 to facilitate operation. Examples include ground speed sensors, engine sensors, positioning sensors, rotor speed sensors, threshing gap sensors, grain yield sensors, threshing load sensors, clean grain quality sensors, straw quality sensors, header height sensors, feederhouse mass flow sensors, and the like. In particular examples, the sensors of the harvester 102 may include one or more grain sensor apparatuses 180 (e.g., grain sensor apparatus 180a and grain sensor apparatus 180b) positioned at one or more locations to collect information about grain flow at the respective location. In one example, the grain sensor apparatuses 180 may be considered grain loss sensor apparatuses that collect information indicate the quantity of grain being "lost" (e.g., not properly transported to an appropriate location for collection and/or further processing).

As schematically shown, one or more of the grain sensor apparatuses 180 may be considered to be at least one separator loss sensor apparatus 180a mounted proximate to the separators 136. The separator loss sensor apparatus 180a provides a signal indicative of grain loss in the left and/or right separators 136. Additional details regarding the separator loss sensor apparatus 180a, particularly within the context of the grain loss monitoring system 100, are provided below.

As also schematically shown, one or more of the grain sensor apparatuses 180 may be considered to be at least one cleaning shoe loss sensor apparatus 180b mounted within or proximate to the cleaning subsystem 144 that operates to provide an output signal indicative of the quantity of grain loss by one or more components of the cleaning subsystem (or cleaning shoe) 144. Additional details regarding the cleaning shoe loss sensor apparatus 180b, particularly within the context of the grain loss monitoring system 100, are provided below.

As introduced above, the harvester 102 includes the operator input device 112 located in the cab 110 to enable the operator to interface with the controller 104, grain loss monitoring system 100, and/or other systems, subsystems, elements, and implements of the harvester 102. The operator input device 112 includes one or more user interface mechanisms, including levers, joysticks, steering wheels, pedals, buttons, audio devices, haptic devices, and the like.

The harvester 102 further includes the display device 114 located in the cab 110 or located remotely and in communication with the controller 104 and configured to present information associated with the harvester 102 to the operator, including information associated with the grain loss monitoring system 100, such as the display of grain loss information in the form of grain counts as discussed in greater detail below. The display device 114 may take any suitable form, including a display monitor, a television, a cellular phone, a tablet, a smart phone, a personal digital assistant (PDA), a laptop, a vehicle dash display, a wearable computing device, a smart watch, a smart helmet, smart glasses, a desktop computer, a work station, or substantially any suitable device capable of interfacing via wireless or wired communication networks to receive and execute computer readable display instructions. In some examples, the operator input device 112 may be incorporated into the display device 114 in the form of input mechanisms displayed on the display, such as links, icons, or other user actuatable mechanisms implemented with touchscreens or other cooperating user input mechanisms.

Although not explicitly shown, the harvester 102 may further include one or more example communication devices that enable communication with the operator, a command center, and/or other vehicles. For example, such communications devices may be used for functions associated with the grain loss monitoring system 100, including the receipt of various processing parameters and/or the sending of grain loss information.

Generally, the controller 104 is provided to control various operational aspects of the harvester 102, either as a dedicated controller 104 for the grain loss monitoring system 100 and/or as a main controller for the harvester 102. The controller 104 may receive inputs from a number of sources, including the operator via the operator input devices 112 and from various sensors, units, and systems onboard or remote from the harvester 102; and in response, the controller 104 generates one or more types of commands for implementation by the various systems of harvester 102. Although the controller 104 is depicted on the harvester 102, aspects may be located remotely and communicate with the harvester 102.

More broadly, the controller 104 may be configured as a computing device with associated processor devices and memory architectures, as a hard-wired computing circuit (or circuits), as a programmable circuit, as a hydraulic, electrical or electro-hydraulic controller, or otherwise. As such, the controller 104 may be configured to execute various computational and control functionality with respect to the harvester 102 (or other machinery). In some embodiments, the controller 104 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller 104 (or a portion thereof) may be configured as an assembly of hydraulic components (e.g., valves, flow lines, pistons and cylinders, and so on), such that control of various devices (e.g., pumps or motors) may be implemented with, and based upon, hydraulic, mechanical, or other signals and movements.

The controller 104 may be in electronic, hydraulic, mechanical, or other communication with various other systems or devices of the harvester 102 (or other machinery). For example, the controller 104 may be in electronic or hydraulic communication with various actuators, sensors, and other devices within (or outside of) the harvester 102, including various devices associated with pumps, control valves, and so on. The controller 104 may communicate with other systems or devices (including other controllers) in various known ways, including via a CAN bus (not shown) of the harvester 102, via wireless or hydraulic communication means, or otherwise.

As introduced above, the controller 104 particularly facilitates implementation of the grain loss monitoring system 100 in which grain loss sensor data is collected and/or evaluated to determine grain loss information during or after the harvesting operation. The grain loss sensor apparatuses 180 and the display device 114 (as well as other relevant components of the harvester 102) may also be considered part of the grain loss monitoring system 100. Additional details regarding operation and implementation of the grain loss monitoring system 100 will be provided below after a more detailed description of an example sensor apparatus 180.

Figure 2:
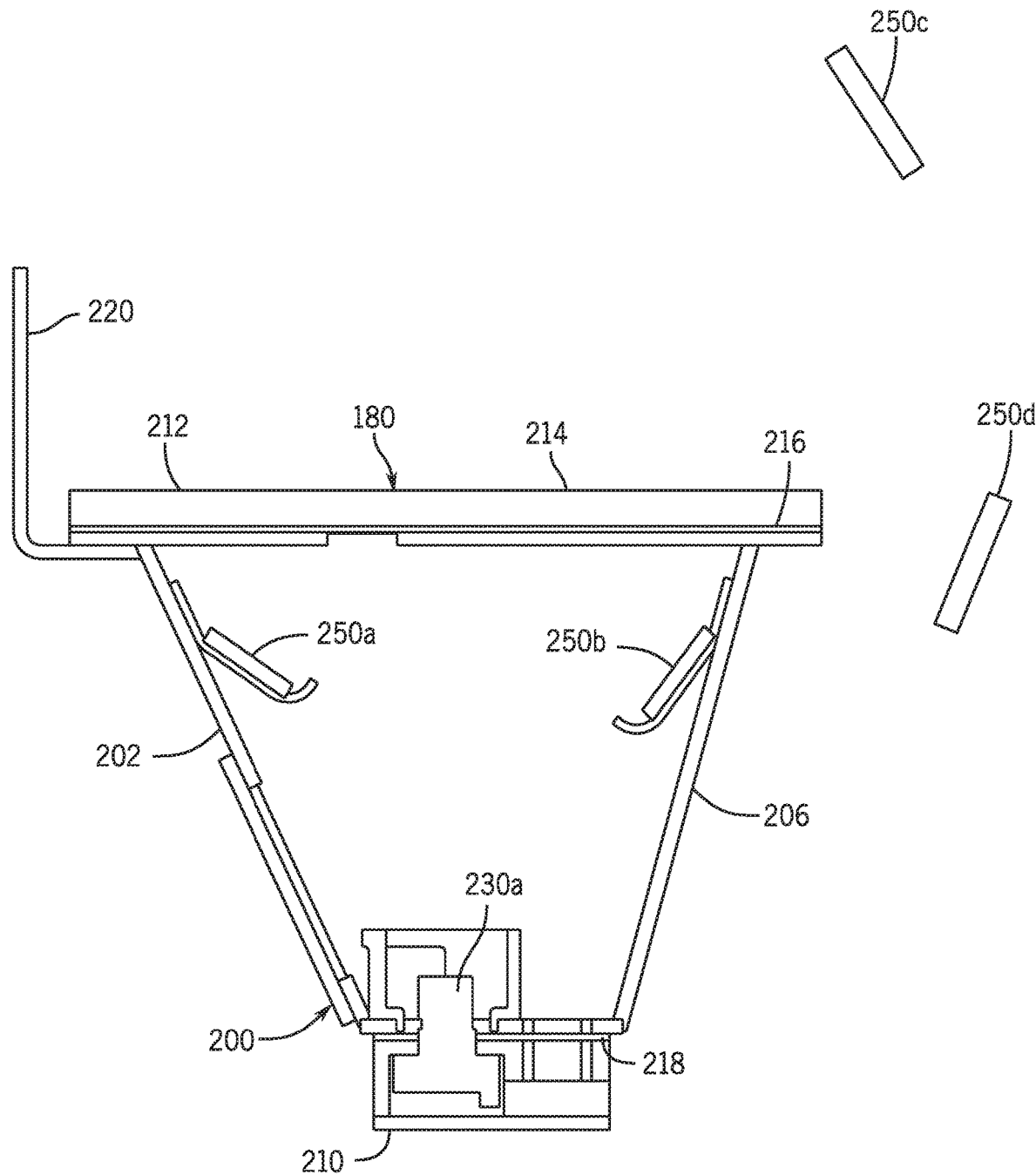
FIG. 2 is a side view of a sensor apparatus of the harvester of FIG. 1 according to this disclosure.
Figure 3:
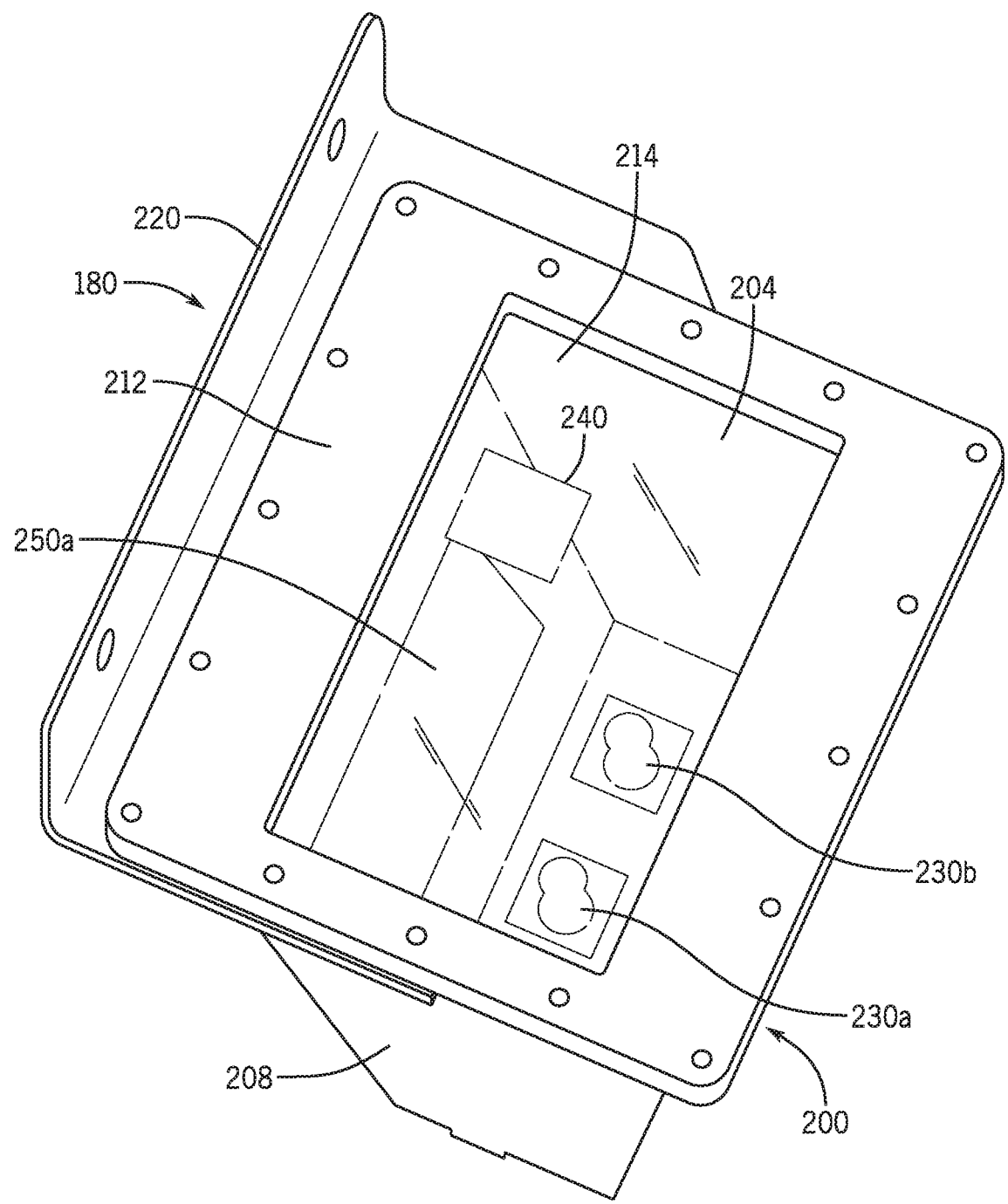
FIG. 3 is a top isometric view of the sensor apparatus of FIG. 2 according to this disclosure.

FIGS. 2 and 3 are side and top isometric views, respectively, of an example sensor apparatus 180 of the grain loss monitoring system 100 according to this disclosure. Generally, the sensor apparatus 180 may correspond to the separator loss sensor apparatus 180*a*, cleaning shoe loss sensor 180*b*, and/or any other type of grain sensor that may be utilized in the grain loss monitoring system 100 described herein.

In one example, the sensor apparatus includes a housing 200 that forms an interior that houses at least one optical or image sensor 230, at least one acoustic sensor 240, and one or more lighting arrays 250. Generally, the housing 200 may be any form. For example, the housing 200 is formed by a number of side walls 202, 204, 206, 208, a bottom wall 210, and a top wall 212. As shown, the side walls 202, 204, 206, 208 may be angled relative to one another to form a generally truncated square pyramid from the top wall 212 to the bottom wall 210. The top wall 212 defines an aperture filled by a transparent panel 214 with an inner surface facing the interior of the sensor apparatus 180 and an outer surface facing the external environment of the sensor apparatus 180. In one example, the transparent panel 214 is formed by a glass panel, such as an approximately 0.25-inch-thick, anti-scratch, and anti-reflective coated glass panel. Generally, the transparent panel 214 is configured to withstand continuous high-speed impacts from agricultural material, including grain, chaff, and MOG. The bottom wall 210 and side walls 202, 204, 206, 208 may be formed by plates, such as aluminum plates, each with a thickness of approximately 0.8 inches. Additionally, the walls 202, 204, 206, 208, 210, 212 may include locations and/or features for mounting various components discussed below.

The top wall 212 may be joined to the side walls 202, 204, 206, 208 with a rubber seal 216 that enables access to the interior of the housing 200. Similarly, the bottom wall 210 may be joined to the side walls 202, 204, 206, 208 with a rubber seal 218.

One or more mounting brackets 220 may be secured to exterior of the housing 200 to enable the mounting of the sensor apparatus 180 to the harvester 102 at a desired location. As best shown in FIG. 2, the mounting bracket 220 may be L-shaped with one leg secured to the underside of the top wall 212 and the other leg configured to be secured at the harvester location. In one example, the mounting bracket 220 is a steel plate.

As noted above, the sensor apparatus 180 includes one or more optical sensors 230. In the depicted example, two optical sensors 230*a*, 230*b* are mounted on the bottom wall 210 with the lenses oriented toward the transparent panel 214. The optical sensors 230*a*, 230*b* may take various forms. In one example, the optical sensors 230*a*, 230*b* may be cameras, such as those manufactured by Basler AG (e.g., Basler dart daA1280-54 um incorporating an AR0134 CMOS sensor (1280×960), 4 mm f2.5 ruggedized lenses rated for vibrations appropriate for the location, and circularly polarized filter over lens).

As described below, the optical sensors 230*a*, 230*b* operate to capture images representing overlapping fields of view (FOVs), through the transparent panel 214, of an external environment of the sensor apparatus 180. That is, each optical sensor 230*a*, 230*b* has a FOV that forms a subportion of the external environment as viewable through the transparent panel 214, and the FOV of each optical sensor 230*a*, 230*b* overlaps so that, in combination, both FOVs include a central or complete view of the viewable external environment through the transparent panel 214. As such, during operation, the optical sensors 230*a*, 230*b* capture images of the agricultural material (e.g., the grain and MOG) as the material impacts and/or moves over the transparent panel 214, thereby generating an image data stream that enables calculation of an image-based grain count.

To facilitate operation of the optical sensors 230a, 230b, one or more lighting arrays 250 may also be provided. In one example, two internal lighting arrays 250a, 250b formed by LED strips covered with linear polarizer film may be mounted on opposing internal surfaces of the side walls 202, 206 at non-perpendicular angles to light the FOVs of the optical sensors 230a, 230b through the transparent panel 214. In some embodiments, additional lighting arrays 250c, 250d may be provided outside the housing 200 to further illuminate the viewable external environment. The additional lighting arrays 250c, 250d may be LED strips similar to the internal lighting arrays 250a, 250b. The additional lighting arrays 250c, 250d may be mounted to the respective sensor apparatus and/or to surrounding vehicle structure with respect to the respective sensor apparatus, in various locations, such as, but not limited to, in a position opposite to the respective sensor apparatus 180 and/or adjacent to the respective sensor apparatus 180. The mounting may encompass being adjustably fixed or stationarily fixed via magnetic mounts, bolts, or the like. Furthermore, the position opposite to the respective sensor apparatus 180 may include the additional lighting array having an illumination direction that points to the transparent panel 214. In some operating examples, the illumination provided by the additional lighting array provides backlighting with respect to the agricultural material as the material impacts and/or moves over the transparent panel 214, and thus allows optical sensors 230a and 230b to capture backlit images of the agricultural material.

As noted above, the sensor apparatus 180 includes one or more acoustic sensors 240. In this example, one acoustic sensor 240 is mounted on the interior surface of the transparent panel 214. The acoustic sensor 240 includes a piezoelectric element that continuously captures a vibration amplitude with respect to time. In particular, the piezoelectric element of the acoustic sensor 240 operates by converting a force acting upon it into a voltage. In the example configuration, the force acting upon the piezoelectric element of the acoustic sensor 240 is the vibration of the transparent panel 214 as agricultural material contacts the transparent panel 214. The piezoelectric element of the acoustic sensor 240 coverts the vibrations from the transparent panel 214 into corresponding voltage amplitudes, continuously with respect to time to generate a time varying amplitude waveform signal as an acoustic data stream that enables calculation of an acoustic-based grain count.

Other components may be associated with the sensor apparatus 180. For example, the sensor apparatus 180 may include an environmental sensor in the form of an ultrasonic microphone.

Figure 4:
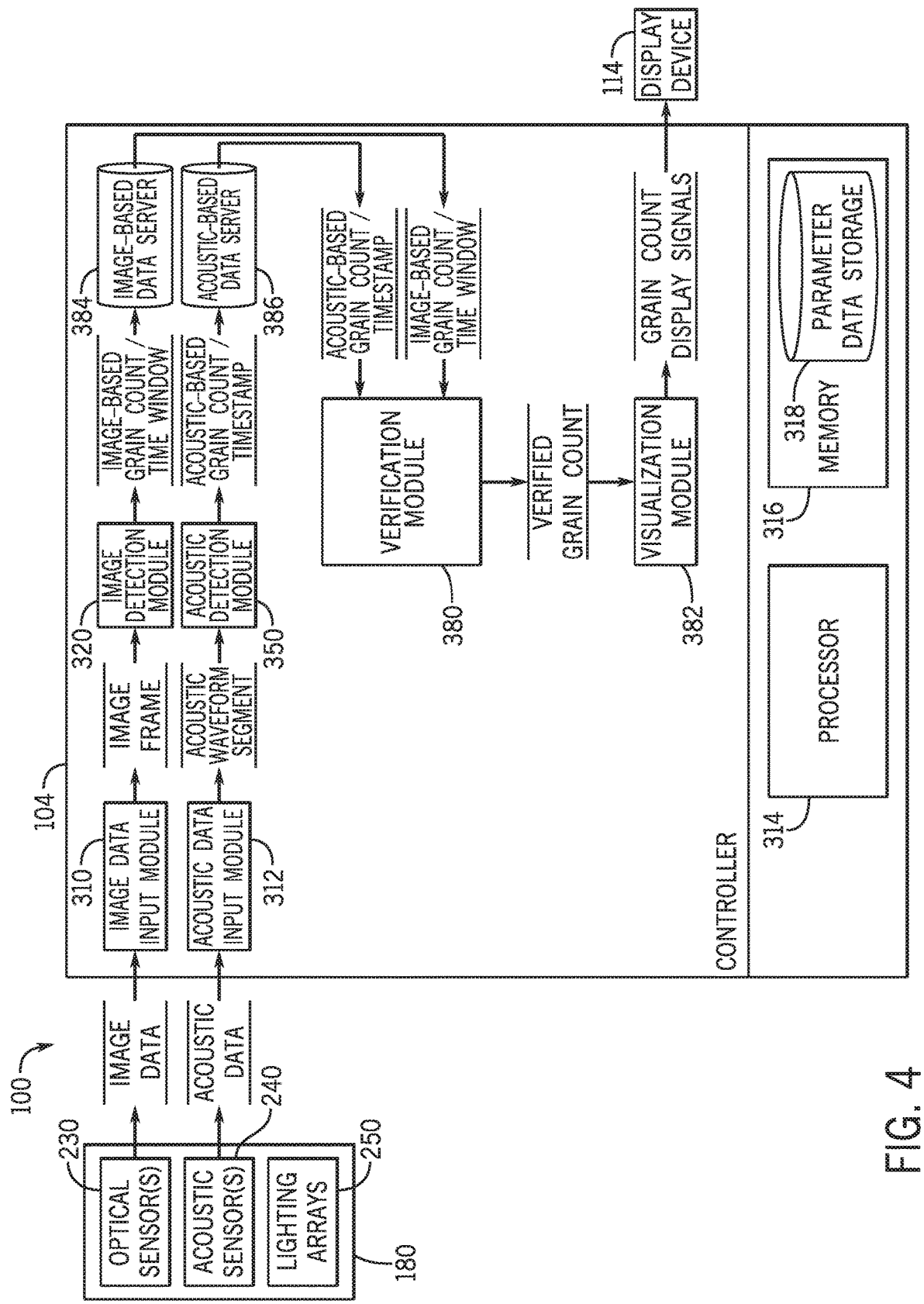
FIG. 4 is a functional block diagram of the grain loss monitoring system of the example harvester of FIG. 1 according to this disclosure.

Reference is now made to FIG. 4, which is a functional block dataflow diagram of the grain loss monitoring system 100 according to an embodiment. As noted above, the grain loss monitoring system 100 may be considered to include the controller 104, at least one sensor apparatus 180, and the display device 114.

In one example, the grain loss monitoring functionality of the controller 104 may be organized as one or more modules 310. 312, 320, 350, 380, 382 and/or servers 384, 386 (e.g., software, hardware, or combinations thereof). As can be appreciated, the modules 310. 312, 320, 350, 380, 382 and/or servers 384, 386 shown in FIG. 4 may be combined and/or further partitioned to carry out similar functions to those described herein. As an example, each of the modules 310. 312, 320, 350, 380, 382 and/or servers 384, 386 may be implemented with processing architecture such as a processor 314 and memory 316, as well as suitable communication interfaces. For example, the controller 104 may implement the modules 310. 312, 320, 350, 380, 382 and/or servers 384, 386 with the processor 314 with programs or instructions stored in memory 316. As also shown, the memory 316 may be considered to include a database or other type of data storage 318 for storing system parameters for use by the modules 310, 312, 320, 350, 380, 382 and/or servers 384, 386, as discussed in greater detail below.

In this example, the modules include an image data input module 310, an acoustic data input module 312, an image detection module 320, an acoustic detection module 350, a verification module 380, and a visualization module 382. The servers may include an image-based data server 384 and/or an acoustic-based data server 386.

As introduced above, the sensor apparatus 180 includes one or more acoustic sensors 240, one or more optical sensors 230a, 230b (collectively referenced below as optical sensor 230), and one or more lighting arrays 250. The acoustic sensor 240 collects acoustic-based information (e.g., with a piezometric element) associated with grain and other material striking the transparent panel 214; and the optical sensors 230 collect image-based information (e.g., with a camera) associated with grain and other material striking and/or passing over the transparent panel 214. The sensor apparatus 180 provides the streams of image-based data and the acoustic-based data to the controller 104. In one example, the streams are provided simultaneously.

As shown, the image-based data stream is provided to the image data input module 310, and the acoustic-based data stream is provided to the acoustic data input module 312. Generally, the acoustic-based data stream is generated continuously, while the image-based data stream is quasi-continuous as a function of the effective frame rate of the optical sensors 230. In some instances, the image-based data stream and acoustic-based data stream may be saved in the memory 316.

The image data input module 310 considers the image-based data stream to identify one or more image frames and associated time data. In particular, an image frame may be associated with time data representing a time instance of image capture for the frame and subsequently, the frame may also be associated with a time window representing a time period between a respective image frame and a subsequent image frame based on the sensor frame rate.

If the optical sensors 230 include two optical sensors and the image data input module 310 receives two image data streams with associated time data, the image data input module 310 generates a single frame from the multiple image-based data streams. For example, each optical sensor 230 captures a frame of image data comprising a portion of the central or complete view of the viewable external environment, through the transparent panel 214 of the sensor apparatus 180. Upon receipt, the image data input module 310 initially removes any overlapping FOV range from one of the optical sensors (e.g., overlapping row and column pixel ranges), if applicable, to create a single image frame of data that corresponds to the entire central or complete view of the viewable external environment, through the transparent panel 214 in which the entire central or complete view corresponds to an entire FOV of one of the optical sensors 230 (e.g., optical sensor 230a) and a partial FOV of the other optical sensor 230 (e.g., optical sensor 230b). In other embodiments, a single image frame may be created by utilizing a single optical sensor 230 in which the FOV of the single optical sensor may include at least the entire central or complete. Other mechanisms for identifying the FOV may be provided. As noted above, the time data indicating the time of image capture is also read and stored in association with the created single image frame.

As noted above, the acoustic-based data stream may be in the form of a time varying amplitude waveform resulting from agricultural material striking the transparent panel 214. Upon receipt, the acoustic data input module 312 digitizes a portion of the acoustic data stream at a sampling rate of the audio interface to result in a digitized acoustic waveform segment.

The image detection module 320 receives the image frame and functions to determine an extrapolated image-based grain count of detectable grains within the image frame based on predetermined shape and color parameters associated with the grains to be detected. The image detection module 320 also determines and/or receives a time window that is associated with the image frame and the extrapolated image-based grain count. As described below, the time window is determined based on the time data associated with the image frame and characteristics of the optical sensors 230. The extrapolated image-based grain count and associated time window from the image detection module 320 are stored in the image-based data server 384. Further details of the image processing within the image detection module 320 will be described below.

In parallel to the operation of the image detection module 320 discussed above, the acoustic detection module 350 receives and processes the digitized acoustic waveform segment to identify instances of grain impact on the transparent panel 214 (e.g., the "grain strikes") and determine an acoustic-based timestamp corresponding to each grain strike based on threshold condition parameters applied to the processed acoustic waveform segment. Each grain strike identified by the acoustic detection module 350 is represented by the acoustic-based timestamp and is stored in the acoustic-based data server 386. Further details of the acoustic waveform segment processing will be described below.

The verification module 380 is configured to access the time windows of extrapolated image-based grain counts and acoustic-based timestamps for the grain strikes in a manner that is cross-correlated for time. In particular, the verification module 380 counts a number of grain strikes with acoustic-based timestamps falling within a corresponding time window associated with an extrapolated image-based grain count and compares the count of grain strikes for the acoustic-based timestamps (as an acoustic-based grain count) to the extrapolated image-based grain count for that time window to determine a verified (or fused) grain count.

In particular, the verification module 380 queries both the image-based data server 384 and the acoustic-based data server 386 for overlapping time periods. In one example, when either of the image-based data server 384 and the acoustic-based data server 386 return no grain counts (e.g., both or one return null values for the extrapolated image-based grain count and an acoustic-based grain count of grain strikes with corresponding acoustic-based timestamps), the verification module 380 generates a verified grain count of zero. When the image-based data server 384 and the acoustic-based data server 386 return non-null grain counts, the verification module 380 compares the number of analogous extrapolated image-based grain counts and the count of grain strikes with associated acoustic-based timestamps, by the verification module 380 executing a programming function that determines a count of acoustic-based timestamps within one or more stored time windows corresponding to or associated with the extrapolated image-based grain counts. In particular, for a given time window associated with an extrapolated image-based grain count, the verification module 380 counts the number of acoustic-based timestamps of grain strikes that fall within a time range defined by the given time window, collectively representing the acoustic-based grain count. The verification module 380 then compares the acoustic-based grain count to the extrapolated image-based grain count for the given time window. Based on this comparison, the verification module 380 sets the verified grain count to the value of the lower count of the extrapolated image-based grain count and acoustic-based grain count. When the extrapolated image-based grain count and acoustic-based grain count are equal, the verified grain count is set to either value of the extrapolated image-based grain count or the acoustic-based grain count. Other mechanisms for verifying and/or fusing the grain count may be provided, such as an average or confidence weighting of the grain counts. The verified grain count may be stored in memory 316 and provided to the visualization module 382. The visualization module 382 generates display signals representing the verified grain count and provides to the display signals to the display device 114. The display device 114 is configured to display the verified grain count to the operator. The system 100 may continue to generate verified grain counts over time as long as additional agricultural material is processed by the harvester 102 and/or as desired by the operator.

Figure 5:
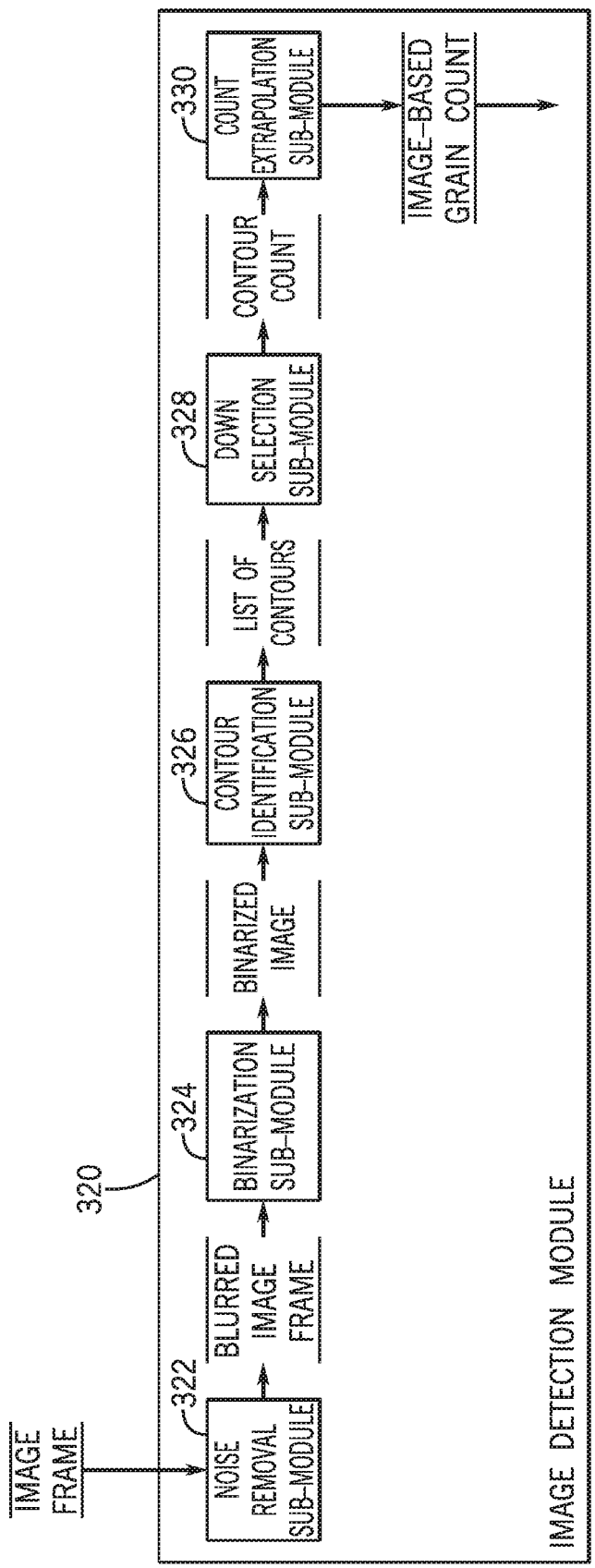
FIG. 5 is a functional block diagram of an image detection module of the grain loss monitoring system of FIG. 4 according to this disclosure.

FIG. 5 is a block diagram with data flows that depicts operation of the image detection module 320 that, as introduced above, determines an image-based grain count from the image frame derived from the image data stream. In one example as shown, the image detection module 320 may be organized into sub-modules, including a noise removal sub-module 322, a binarization sub-module 324, a contour identification sub-module 326, a down selection sub-module 328, and a count extrapolation sub-module 330.

The noise removal sub-module 322 receives the image frame and operates to remove the background noise to result in a filtered, blurred, and/or smoothed image frame (generally, a "blurred image frame"). In one example, the noise may be removed by executing a programming function to create a new image frame with background noise removed, and afterwards, executing a function to apply a gaussian kernel to create the blurred image frame.

The binarization sub-module 324 receives the blurred image frame and generates a binarized image. In one example, the blurred image frame may be binarized by performing a binarization programming function that initially determines a probability of each pixel within the blurred image frame being a foreground pixel frame. Continuing the example, pixels with determined probabilities that are above a threshold value are maintained for further processing steps and pixels with probabilities below the threshold are not further processed (e.g., set to black). The maintained pixels form a binarized image.

The contour identification sub-module 326 receives the binarized image and generates a list of contours. In one example, the list of identified contours is created from the binarized image by executing a contour identification programming function within the contour identification sub-module 326 to identify image contours of the binarized image. Each identified contour in the list is defined by a pixel position array corresponding to boundary points of the contour as identified from the binarized image.

The down selection sub-module 328 receives the list of contours and selects appropriate contours that satisfy predetermined conditions to result in a list of selected contours. In one example, the down selection sub-module 328 performs at least two programing functions, including a shape-based down selecting programming function and a color-based down selecting programming function. In other examples, the down selection sub-module 328 may perform only one of the two functions depending upon the needs of a particular application. For example, in some cases and without limitation, the captured and processed image data may be acquired under backlit conditions, and thus, images may not have much color information other than black and white such that a color-based down selecting may not be necessary.

Generally, the predetermined contour conditions are used to identify color and shapes that represent grains within the agricultural material, and each down selecting programming function of the down selection sub-module 328 operates to filter the identified contour list to remove identified contours from further processing when a given identified contour does not satisfy a set of predetermined shape and/or color conditions. That is, the down selecting programming functions to identify and save contours based on the contours satisfying shape criteria from predetermined sets of shape parameters and color parameters. A further programming function of the down selection sub-module 328 counts the number of saved contours after the down selecting functions have been executed on a contour identified image frame to result in a contour count. Additional details about the down selection sub-module 328 are provided below.

The count extrapolation sub-module 330 receives the contour count and generates the image-based grain count. The count extrapolation sub-module 330 implements a count extrapolation programming function that uses predetermined extrapolation parameters to extrapolate a count of grains as an estimation of grains associated with the relevant time window and detected within the image frame. As noted above, the extrapolated count and corresponding time window are stored in the image-based data server 384 for further processing by the verification module 380. Additional details about the count extrapolation sub-module 330 are provided below.

Figure 6:
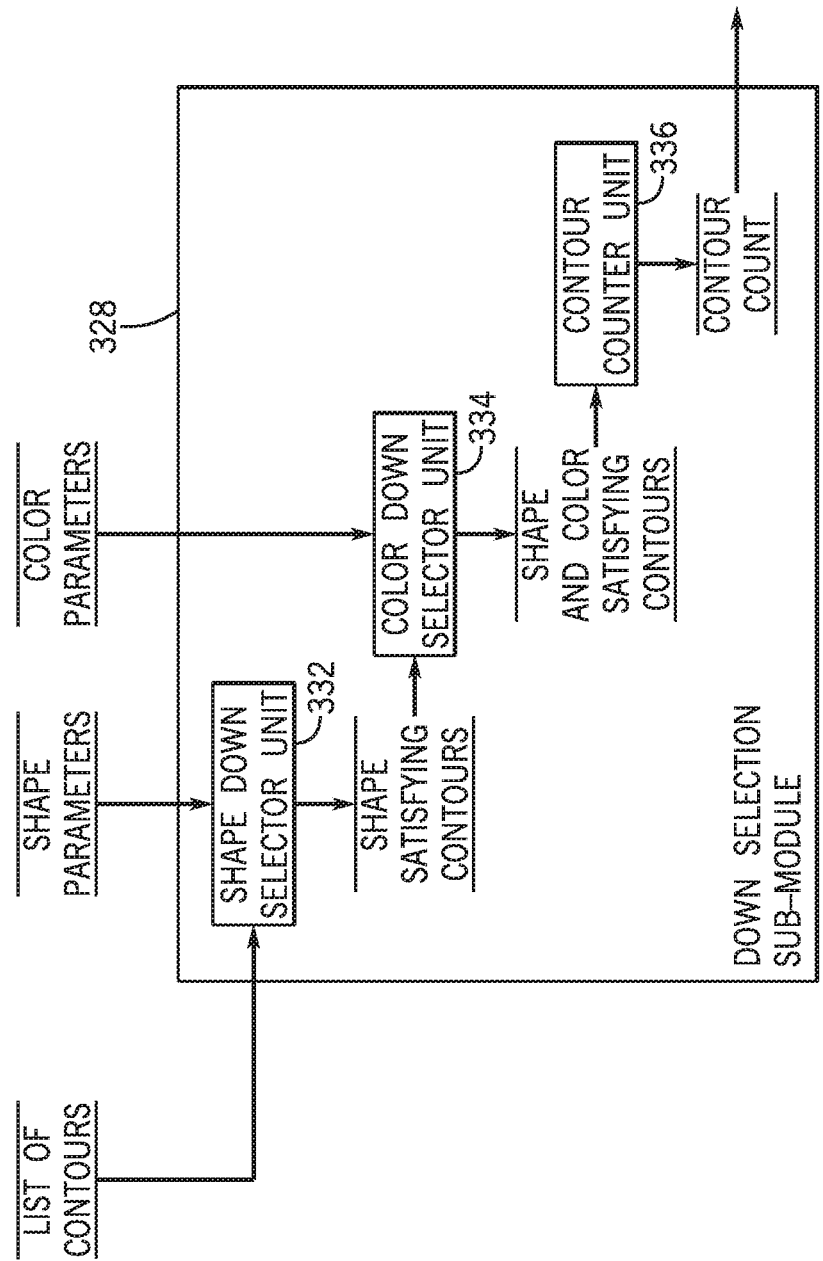
FIG. 6 is a functional block diagram of a down selection sub-module of the image detection module of FIG. 5 according to this disclosure.

FIG. 6 is a block diagram with data flows depicting an example operation of the down selection sub-module 328. As noted above, the down selection sub-module 328 generates the count of contours from the identified list of contours that satisfy criteria within the shape and contour parameters. As shown, the down selection sub-module 328 includes a shape down selector unit 332, color down selector unit 334, and a contour counter unit 336.

In one example, aspects of image detection module 320 are initialized offline, including the storage of color and shape parameters utilized by the down selection sub-module 328 that represent grain characteristics within the external environment of the sensor apparatus 180. In particular, an operator may enter and/or define processing conditions of shape parameters and color parameters depending upon the needs of a particular application. For example, and without limitation, the predetermined parameters for down selection may vary according to the type of grain (e.g., wheat, corn, chaff, canola) to be processed and/or the sensor configuration being utilized (e.g., internally lit or backlit). In some examples, the grain loss monitoring system 100 may allow for parameters to be adjusted during operation. In addition to the examples discussed below, other physical dimensional and visual measurements that may characterize the appearance of a selected grain type may also be utilized, such as elongation, eccentricity, reflectance, etc.

As shown, the identified contours are received by the shape down selector unit 332. The shape down selector unit 332 also receives or accesses shape parameters from data storage 318. As examples, the shape parameters may include, but are not limited to, a minimum extent value, a minimum and maximum area (e.g., an area range), a minimum and maximum aspect ratio (e.g., an aspect range), and a minimum solidity. In an example wheat processing embodiment, an area range may be set from 260-1000 pixels (depending on the image sensor and/or a lens of the imaging sensor); a minimum extent may be set at 0.59, wherein an extent may be represented as a ratio of contour area to bounding rectangle area; an aspect range may be set from 0.5 to 2, wherein an aspect ratio may be represented as a ratio of bounding rectangle width to bounding rectangle height; and a minimum solidity may be set to 0.9, wherein an solidity may be represented as a ratio of contour area to convex hull area. These values may be determined experimentally by visually analyzing test images of wheat and using image analysis software to manually measure wheat objects in the images with respect to the shape parameters.

During execution, the shape down selector unit 332 uses the pixel position array of boundary points for a given contour and calculates an extent, an area, an aspect ratio, and a solidity for the given contour. Then, the shape down selector unit 332 determines shape satisfying contours by comparing these calculated shape parameters to the corresponding predetermined shape parameters such that the shape satisfying contours are determined to satisfy one or more shape criteria. Specifically, for the given contour, the shape down selector unit 332 determines if a positive or negative comparison exists for the following shape criteria: the calculated extent of the contour is greater than or equal to the predetermined minimum extent; the calculated solidity of the contour is greater than or equal to the predetermined minimum solidity; the calculated area of the contour is less than the predetermined maximum area and greater than or equal to the predetermined minimum area; and the calculated aspect ratio is less than the predetermined maximum aspect ratio and greater than or equal to the predetermined minimum aspect ratio. In one example, the respective contour is discarded if it fails to satisfy one or more of these criteria, and contours that satisfy each of these criteria are saved in an updated contour list and provided to the color down selector unit 334 for further processing. In alternative embodiments, only a subset of the criteria may need to be satisfied for a given contour to be saved in the updated contour list. That is, a contour may be determined to have some unsatisfied parameter criteria but still be saved in the updated contour list. The updated list with shape satisfying contours is provided to the color down selector unit 334 for further consideration.

The color down selector unit 334 receives or accesses color parameters from data storage 318. In particular, the color parameters may correspond to an HSV (hue, saturation, value) color space representation of pixel values of an entire area for a given contour of the updated contour list. The color parameters received may include, but are not limited to, a first or lower color setting, a second or higher color setting, and a minimum color ratio. As examples, a lower color setting may be [H=358°, S=0.7, V=0.1], a higher color setting may be [H=50°, S=1, V=0.3], and a minimum color ratio may be set to 0.1. The color settings are chosen to cover a range of color space. As above, such values may be determined experimentally by visually analyzing test images of grain and using image analysis software to manually measure grain objects in the images with respect to the color parameters.

During application of the color parameters, the color down selector unit 334 isolates the contours within the created single image frame using the defined pixel position array corresponding to the boundary points of the contours of the updated contour list. Then, the color down selector unit 334 calculates a color ratio for each isolated contour that includes counting a total number of pixels in an isolated contour, counting a number of pixels that have each and every HSV value within a corresponding HSV range defined by the lower color setting and the higher color setting, and taking a ratio of the two counts. The color down selector unit 334 then identifies the contours for which the calculated color ratio is greater than or equal to the predetermined minimum color ratio. The resulting color satisfying contours are saved as a list of shape and color satisfying contours that is then provided to a contour counter unit 336.

The contour counter unit 336 of the down selection sub-module 328 generates a contour count ($C_I$) by determining the length of the count contour list after all contours of the updated contour list have been processed to satisfy the shape and color parameters. The counter count ($C_I$) is then stored in association with the time window of the corresponding image frame and provided to the count extrapolation sub-module 330.

Figure 7:
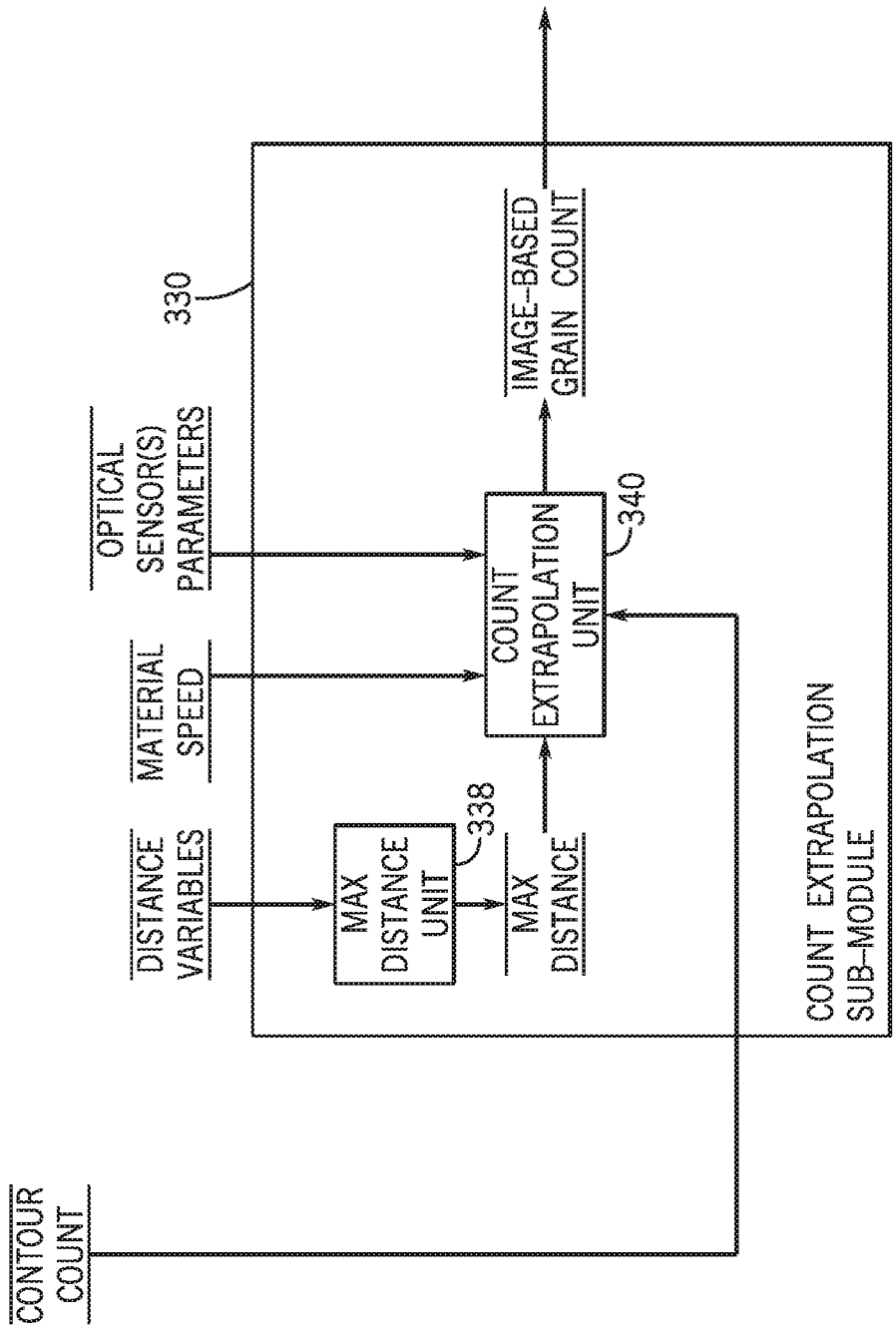
FIG. 7 is a functional block diagram of a count extrapolation sub-module of the image detection module of FIG. 5 according to this disclosure.

FIG. 7 is a block diagram with data flows depicting operation of the count extrapolation sub-module 330. As noted above, the count extrapolation sub-module 330 receives the contour count and generates the image-based grain count.

More specifically, as shown, the count extrapolation sub-module 330 may be organized into a maximum distance unit 338 and a count extrapolation unit 340. The maximum distance unit 338 and/or count extrapolation unit 340 access or otherwise receive various parameters prestored in data storage 318, including parameters associated with the optical sensors 230 and/or the type of agricultural material being harvested. In one example, an operator may enter and/or define the count extrapolation parameters during offline initialization based on the particular application. For example, and without limitation, the parameters for count extrapolation may also vary according to grain type, optical sensor specifications, and sensor apparatus location.

As one example, the maximum distance unit 338 receives parameters in the form of distance variables, including the seed (e.g., grain) height in millimeters ($H_{seed\_mm}$), the seed height in pixels ($H_{seed\_pixels}$) the effective or actual optical sensor height in millimeters ($H_{sensor\_mm}$), the effective or actual optical sensor height in pixels ($H_{sensor\_pix}$), and the effective or actual focal length of the lens of the optical sensors 230.

The maximum distance unit 338 of the count extrapolation sub-module 330 receives these parameters and determines a maximum distance away from optical sensors 230$a$ and 230$b$ in which a grain may be observed according the following formula:

$$D_m = \frac{H_{seed\_mm}}{H_{seed\_pix}} * \frac{H_{sensor\_mm}}{H_{sensor\_pix}} * FL_{lens}$$

wherein
$D_m$ is the maximum distance to observable grain based on the predetermined distance variables,
$H_{seed\_mm}$ is the seed/grain height in millimeters,
$H_{seed\_pix}$ is the seed/grain height in pixels,
$H_{sensor\_mm}$ is the sensor height in millimeters,
$H_{sensor\_pix}$ is the sensor height in pixels, and
$FL_{lens}$ is the focal length of the lens.

The maximum distance unit 338 provides the maximum distance value ($D_m$) to the count extrapolation unit 340. The count extrapolation unit 340 also receives the contour count ($C_I$) and a number of parameters from data storage 318. The parameters may include the grain speed (S), the effective or actual frame rate (FR) of the optical sensors 230, and the effective or actual exposure time (ET) of the optical sensors 230. The count extrapolation unit 340 functions to calculate the extrapolated count representing the image-based grain count from the contour count ($C_I$), the maximum distance to observable grain ($D_m$), and the parameters according to the following formula:

$$C_E = C_I * \frac{S}{D_m} * \left(\frac{1}{FR} - ET\right)$$

wherein
$C_E$ is the extrapolated count,
$C_I$ is contour count in the associated time window,
S is the grain speed,
$D_m$ is the maximum distance to observable grain based on the predetermined distance variables,
FR is the camera frame rate, and
ET is the camera exposure time.

In effect, the count extrapolation unit 340 estimates the extrapolated count ($C_E$) as the number of detectable grains in the created image frame and grains that are assumed to be capturable between image capturing instances based on the frame rate. The extrapolated count ($C_E$) is considered the image-based grain count and stored with the associated time window in the image-based data server 384 for subsequent consideration by the verification module 380, discussed above.

Figure 8:
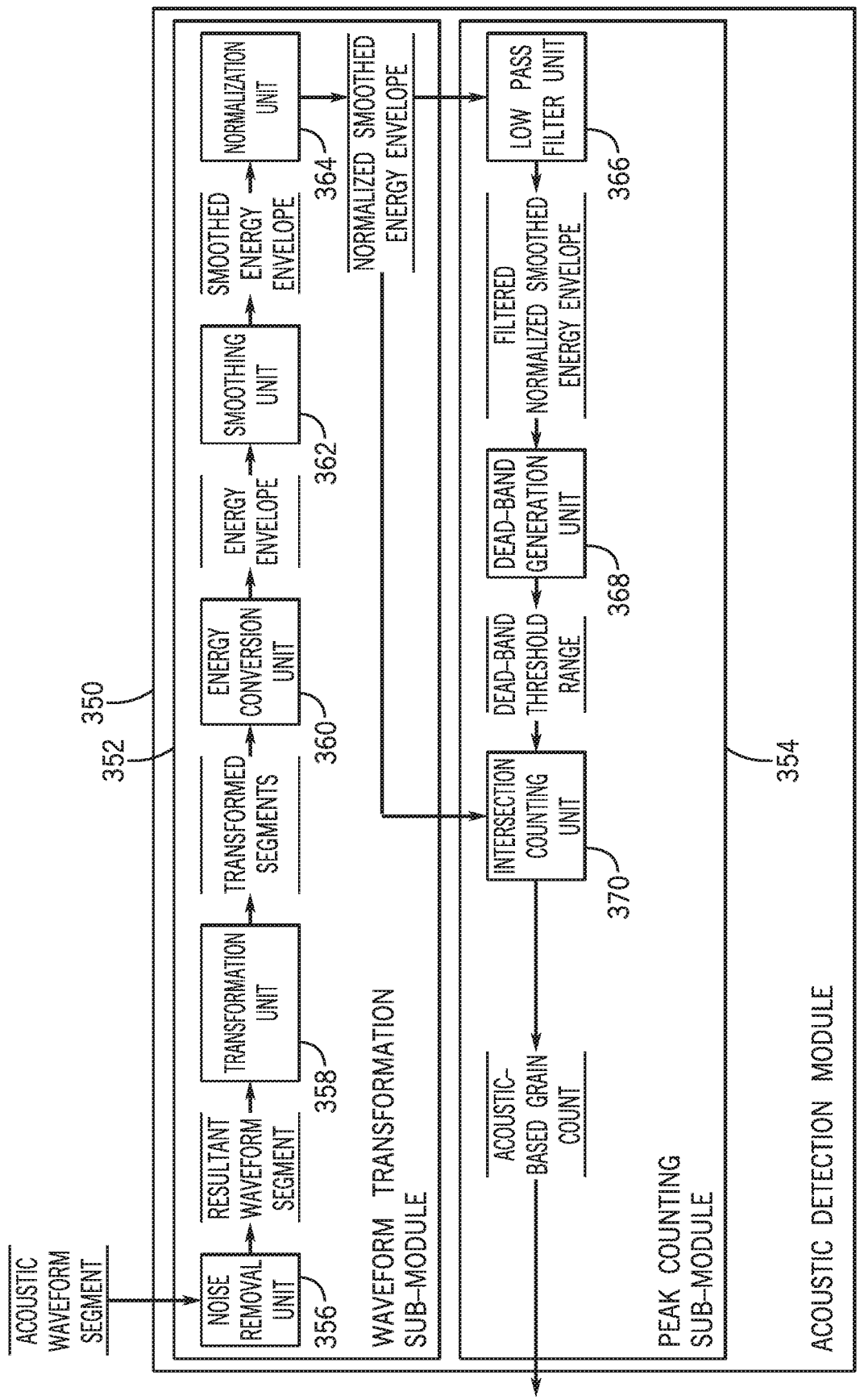
FIG. 8 is a functional block diagram of an acoustic detection module of the grain loss monitoring system of FIG. 4 according to this disclosure.

FIG. 8 is a functional block diagram with data flows depicting operation of the acoustic detection module 384 that operates to generate an acoustic-based grain count from the sampled waveform acoustic data. Generally, the acoustic detection module 350 may be organized as a waveform transformation sub-module 352 and a peak counting sub-module 354. The waveform transformation sub-module 352 may be organized as a noise removal unit 356, a transformation unit 358, an energy conversion unit 360, a smoothing unit 362, and a normalization unit 364; and the peak counting sub-module 354 may be organized as a low pass filter unit 366, a dead-band generation unit 368, and an intersection counting unit 370.

As noted above, the acoustic detection module 350 receives the acoustic waveform segment, previously acquired from the acoustic data stream collected by the acoustic sensor 240 and sampled for signal processing by the acoustic data input module 312. The acoustic waveform segment is initially received by the noise removal unit 356 for removal of noise. In one example, the noise is removed by executing a programming function that applies a band pass filter to the waveform segment to remove high frequency noise and low frequency background to generate a resultant waveform segment. As noted above, in some examples, additional sensors, such as one or more ultrasonic microphones may be provided. In such embodiments, the ultrasonic microphone may identify external machine noise that may be removed from the acoustic waveform segment.

The resultant waveform segment is provided to the transformation unit 358 for application of a Short-Time Fourier transformation (STFT). In one example, to perform the transformation, the transformation unit 358 initially executes a programming function that divides the resultant waveform segment into shorter time segments. The time length of each shorter segment may be referred to as a "hop-time." In one example, a hop-time was experimentally determined to be 3 milliseconds. It is noted that a hop-time may be selected depending upon the needs suitable for a particular application. Subsequently, the transformation unit 358 executes a second programming function that applies a Fourier transform such that each shorter segment is transformed into frequency space, and thus defined by amplitudes and respective corresponding frequencies, thereby resulting in transformed segments.

The transformed segments are provided to the energy conversion unit 360. The energy conversion unit 360 determines a local energy of each transformed segment. In one example, the local energy is determined by executing a programming function that sums the amplitude values across all frequencies of a respective transformed segment in which each amplitude value is weighted by the absolute value of its corresponding frequency. That is, the energy conversion unit 360 determines a weighted amplitude sum for the respective segment in which the weight applied to each amplitude is the absolute value of the corresponding frequency of the amplitude. In another example, the weighted square of the amplitude values may be utilized. The weighted amplitude sum (or weighted squared amplitude sum) is considered the local energy of the segment. The energy conversion unit 360 produces the weighted amplitude sum value for each transformed segment, and thus, creates an energy envelope that is formed by a plurality of local energies in which each local energy corresponds to each segment with a hop-time length, respectively.

The smoothing unit 362 receives the energy envelope. In one example, the smoothing unit 362 operates to smooth the energy envelope by executing a programming function that applies a Hann window to the energy envelope in which the width of the Hann window is twice the hop-time to result in a smoothed energy envelope.

The normalization unit 364 receives the smoothed energy envelope. In one example, normalization unit 364 operates to calculate the median of the smoothed energy envelope and divide each amplitude of the smoothed energy envelope by the calculated median. That is, the smoothed energy envelope is normalized by the median of the energy envelope. The normalized smoothed energy envelope is then provided to the peak counting sub-module 354.

In many operating examples, the normalized smoothed energy envelope may include a number of peaks, and a number of these peaks are considered to represent an instance of grain striking the transparent panel 214 of the sensor apparatus 180. In some operating examples, not all peaks are indicative of strikes. Therefore, according to embodiments discussed herein, the peak counting sub-module 354 operates to detect and count strike indicative peaks of the normalized smoothed energy envelope by determining an occurrence of a strike indicative peak event (e.g., an intersection event) as described below.

Initially, the low pass filter unit 366 of the peak counting sub-module 354 generates a threshold by executing a programming function that applies a low pass filter to the normalized smoothed energy envelope to create a filtered normalized smoothed energy envelope. Subsequently, the dead-band generation unit 368 processes the filtered normalized smoothed energy envelope to create a dead-band threshold range formed by upper and lower limits by widening each amplitude value of the filtered normalized smoothed energy envelope. In one example, the lower limit is a given amplitude value of the filtered normalized smoothed energy envelope at an associated time point; and the upper limit is a product of a weight and the given amplitude value at the same time point in which an applicable weight may be a weight greater than one and less than two. In one example, the weight is set to 1.05. In some instances, the width of the dead-band threshold range accounts for signal ringing (e.g., transients) and may reduce the counting of false positives. A weight that is too high may result in a dead-band threshold range that is too wide (e.g., such that too few or no counts are detected), and a weight that is too low may result in a dead-band threshold range that is too narrow (e.g., such that inadvertent fluctuations are detected and counted). Experimentation conducted with a controlled set of acoustic data and a known number of grains may be used to provide an appropriate weight, although different weight values may be used depending upon the needs of a particular application, differences in grain type, and variations in sensor mechanics. The dead-band generation unit 368 outputs the dead-band threshold range to the intersection counting unit 370.

The intersection counting unit 370 receives the dead-band threshold range and the normalized smoothed energy envelope and compares the dead-band threshold range to the normalized smoothed energy envelope to detect a strike indicative peak representing a grain strike. In one example, a strike indicative peak event is detected by the intersection counting unit 370 identifying when the amplitude of the normalized smoothed energy envelope rises above the upper limit of the dead-band threshold range at a first time point and subsequently falls below the lower limit of the dead-band threshold range at a later second time point. For example, the intersection counting unit 370 operates to track and/or monitor the amplitude values of the normalized smoothed energy envelope as an event (or strike) counter. Initially, an event counter is initialized to a null state. During the tracking and/or monitoring, the intersection counting unit 370 may detect a situation in which the amplitude of the normalized smoothed energy envelope becomes greater than the upper limit of the dead-band threshold range (e.g., detects a first intersection). In this detected situation, the intersection counting unit 370 further determines if the event counter is set to the null state. When true, the event counter is set to an intermediate state. During subsequent tracking and/or monitoring, in the situation in which the event counter has been set to the intermediate state, the intersection counting unit 370 detects a situation in which the amplitude of the normalized smoothed energy envelope becomes less than the lower limit of the dead-band threshold range (e.g., detects a second intersection). In response, the event counter is set back to null and the programming function stores the time point that corresponds to the first intersection in the acoustic-based data server 386 for further processing by the verification module. The stored time point is analogous to an acoustic-based timestamp. In effect, an occurrence of the waveforms intersecting as described above is indicative of a peak resulting from a strike of grain on the transparent panel 214. The number of these strikes within a particular time window corresponds to the acoustic-based grain count.

Figure 9:
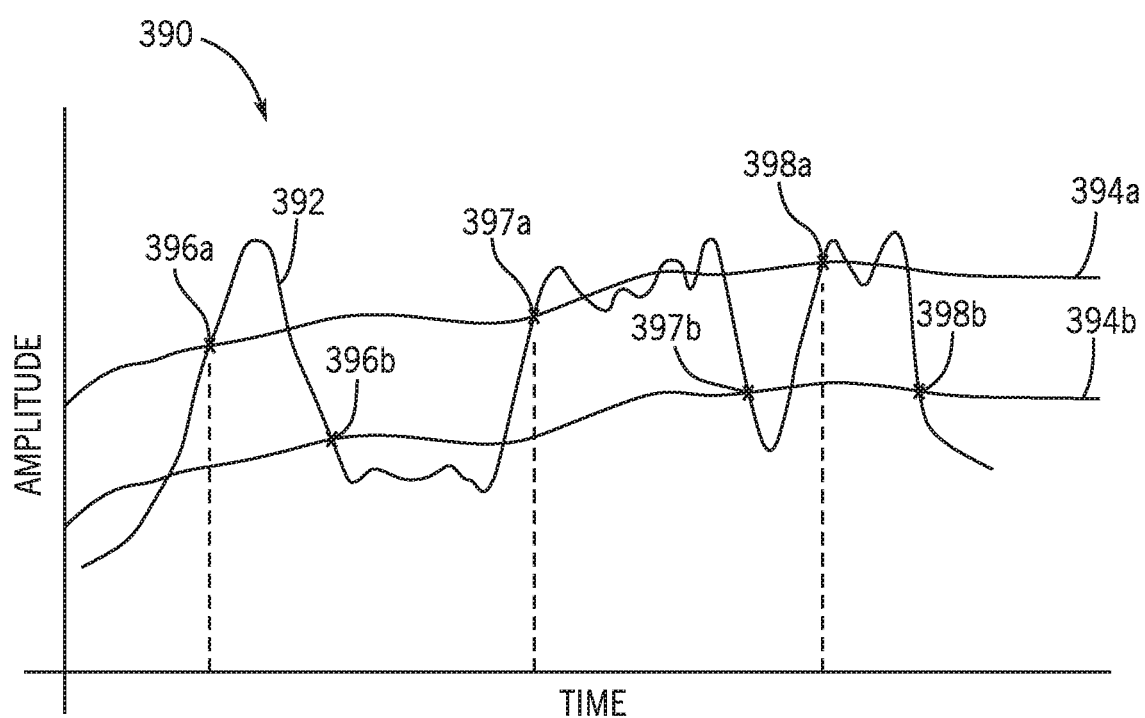
FIG. 9 is an example chart depicting representative data relationships used by the acoustic detection module of FIG. 8 according to this disclosure.

The example chart 390 depicted in FIG. 9 illustrates some example intersection situations in accordance with an operating example of the intersection counting unit 370. In particular, the chart 390 includes an example normalized smoothed energy envelope 392 represented by amplitudes with respect to time, as well as an example dead-band threshold range formed by an upper limit 394a and a lower limit 394b. As shown and in accordance with the description above, the intersection counting unit 370 may operate to identify the example illustrated intersection situations in which the amplitude of the normalized smoothed energy envelope 392 rises above the upper limit 394a of the dead-band threshold range (e.g., at points 396a, 397a, 398a) and subsequently, with respect to each of the points 396a, 397a, and 398a, identify the example illustrated intersection situations in which the amplitude of the normalized smoothed energy envelope 392 falls below the lower limit 394b of the dead-band threshold range (e.g., at points 396b, 397b, 398b). Each of these intersection situation pairs (396a-396b, 397a-397b, and 398a-398b) is identified as a grain strike instance with a corresponding timestamp, such that in accordance with this example, there would be three identified grain strike instances. Moreover, the corresponding timestamp for each instance is the time of initial intersection of the situation pairs (e.g. the timepoints corresponding to intersection points 396a, 397a, 398a).

As described above, the acoustic-based grain count is considered by the verification module 380 (FIG. 3) with respect to the extrapolated image-based grain count to generate the verified grain count.

Figure 10:
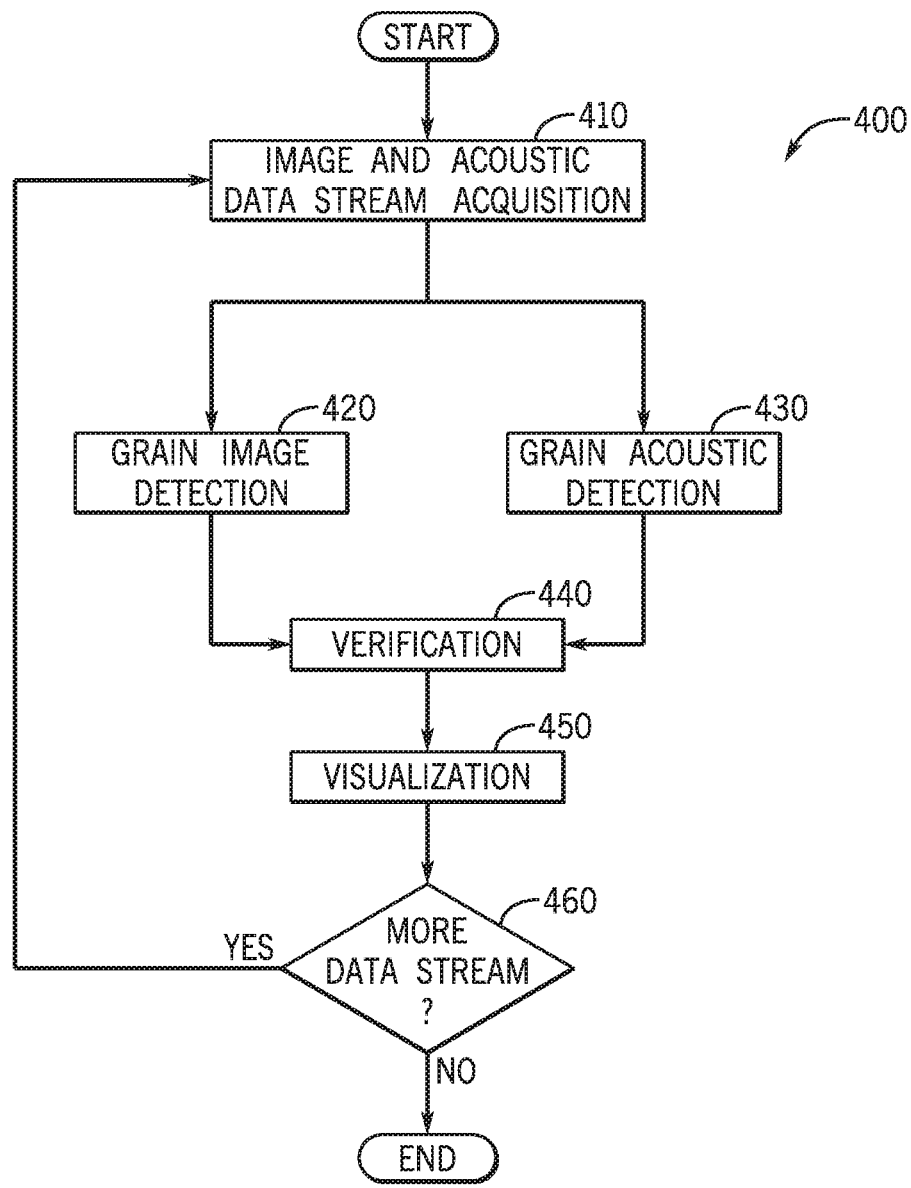
FIG. 10 is a flow chart of a method for monitoring grain loss according to this disclosure.

The embodiments discussed above may additionally be expressed as a method 400, such as reflected in the flow chart depicted in FIG. 10. In one example, the method 400 may be implemented by the system 100 described above, while in further examples, other mechanisms may be used. Operation of the grain loss monitoring system 100 and/or implementation of the method 400 may be manually initiated by the operator and/or automatically during a harvesting operation. In a first step 410, the image and acoustic data streams are collected by one or more sensor apparatuses. In a second step 420, the image data stream is evaluated to generate an image-based grain count; and in a parallel third step 430, the acoustic data stream is evaluated to generate an acoustic-based grain count. In a fourth step 440, the image-based grain count and acoustic-based grain count are evaluated with respect to one another in associated time to generate a verified grain count. In a fifth step 450, the verified grain count is displayed to the user. In a final step 460, the system 100 determines if additional acoustic and/or image data streams reflecting grain flow are being received. If additional data is being received, the method 400 performs a further iteration; and if additional data is not being received, the method 400 terminates.

Accordingly, the embodiments discussed herein provide a grain loss monitoring system and/or method for determining and/or evaluating grain loss of an agricultural harvesting machine that improves operation of the harvester and/or crop collection results. Although the system disclosed herein is described with respect to a grain loss monitoring system, the system may also be implemented as a system that monitors grain for storage or further processing. In other words, the systems and methods described herein may be used for any type of grain flow, including positive grain yield. Moreover, although various example characteristics of the harvester are presented above, it will be appreciated that the combine harvester may include other elements or configurations and/or may be implemented in other types of harvesting functions and/or harvesting machines.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

Also, the following examples are provided, which are numbered for convenient reference, as follows:

1. A sensor apparatus for a grain loss monitoring system associated with an agricultural material, comprising: a housing with a plurality of walls forming an interior, the plurality of walls comprising at least one first wall including a transparent panel with an inner surface facing the interior and an outer surface facing opposite the inner surface; at least one acoustic sensor arranged within the interior of the housing and configured to collect an acoustic data stream of vibrations associated with the agricultural material striking the transparent panel; and at least one optical sensor arranged within the interior of the housing and configured to collect an image data stream of images of the agricultural material through the transparent panel, wherein the at least one acoustic sensor is configured to provide the acoustic data stream and the at least one optical sensor is configured to provide the image data stream such that a verified grain count is determined based on the acoustic data stream and the image data stream.

2. The sensor apparatus of example 1, wherein the at least one acoustic sensor is a piezoelectric device mounted on the inner surface of the first wall that captures time varying voltage amplitudes as the acoustic data stream.

3. The sensor apparatus of example 1, wherein the at least one optical sensor includes at least two cameras, each configured to capture a series of image frames within a field of view as the image data stream.

4. The sensor apparatus of example 1, wherein the plurality of walls includes at least a first side wall and a second side wall, and the sensor apparatus further comprises at least a first lighting array mounted on the first side wall within the enclosure and a second lighting array mounted on the second side wall within the enclosure.

5. A grain loss monitoring system for a harvesting machine configured to process agricultural material, comprising: a sensor apparatus, comprising: a housing with a plurality of walls forming an interior, the plurality of walls comprising at least one first wall including a transparent panel with an inner surface facing the interior and an outer surface facing opposite the inner surface; at least one acoustic sensor arranged within the interior of the housing and configured to collect an acoustic data stream associated with the agricultural material striking the transparent panel; and at least one optical sensor arranged within the interior of the housing and configured to collect an image data stream of images of the agricultural material through the transparent panel; and a controller coupled to receive the image data stream and the acoustic data stream, the controller configured to determine an acoustic-based grain count from the acoustic data stream, to determine an image-based grain count from the optical data stream, and to calculate a verified count based on the acoustic-based grain count and the image-based grain count.

6. The grain loss monitoring system of example 5, further comprising a display device coupled to the controller and configured to display the verified grain count.

7. The grain loss monitoring system of example 5, wherein the controller is configured to determine the acoustic-based grain count at least partially simultaneously as the image-based grain count.

8. The grain loss monitoring system of example 5, wherein the controller is configured to calculate the acoustic-based grain count as the verified grain count when the acoustic-based grain count is less than the image-based grain count and to calculate the image-based grain count as the verified grain count when the image-based grain count is less than the acoustic-based grain count.

9. The grain loss monitoring system of example 5, wherein the controller is further configured to, in order to determine the image-based grain count, identify an image frame from the image data stream and a time window associated with the image frame; calculate the image-based grain count from the image frame; and store the image-based grain count and the time window in an image-based data server.

10. The grain loss monitoring system of example 9, wherein the controller is further configured to, in order to calculate the image-based grain count from the image frame, remove background noise from the image frame to generate a blurred image frame; create a binarized image from the blurred image frame; generate a list of contours from the binarized image; apply down selection to the list of contours based on at least one of shape parameters and color parameters to result in a list of selected contours; generate a contour count from the list of selected contours; and apply an extrapolation to the contour count to generate the image-based grain count.

11. The grain loss monitoring system of example 10, wherein the controller is further configured to, in order to apply the extrapolation to the contour count, apply a first set of parameters to contour count, wherein the first set of parameters includes at least one of a maximum distance to observable grain proximate to the at least one optical sensor, a frame rate associated the at least one optical sensor, an exposure time associated with the at least one optical sensor, and a grain speed.

12. The grain loss monitoring system of example 11, wherein the controller is further configured to, in order to determine the acoustic-based grain count, determine an acoustic waveform segment from the acoustic data stream; remove noise from the acoustic waveform segment to generate a resultant waveform segment; transform the resultant waveform segment with a Short-Time Fourier transformation to generate transformed segments; determine a local energy of each transformed segment to result in an energy envelope; smooth the energy envelope to result in a smoothed energy envelope; normalize the smoothed energy envelope to result in a normalized smoothed energy envelope; and identify and count strike indicative peak events from the normalized smoothed energy envelope to result in the acoustic-based grain count.

13. The grain loss monitoring system of example 12, wherein the controller is further configured to, in order to identify and count the strike indicative peak events, apply a low pass filter to the normalized smoothed energy envelope to result in a filtered normalized smoothed energy envelope; generate a dead-band threshold range of upper and lower limits using the filtered normalized smoothed energy envelope; compare the dead-band threshold range to the normalized smoothed energy envelope; and identify and count the strike indicative peak events for the filtered normalized smoothed energy envelope relative to the dead-band threshold range to result in the acoustic-based grain count.

14. The grain loss monitoring system of example 5, wherein the at least one acoustic sensor is a piezoelectric device mounted on the inner surface of the first wall that captures time varying voltage amplitudes as the acoustic data stream, and wherein the at least one optical sensor includes at least two cameras, each configured to capture a series of image frames within a field of view.

15. The grain loss monitoring system of example 5, wherein the sensor apparatus is a separator loss sensor apparatus or a cleaning shoe loss sensor apparatus.

As will be appreciated by one skilled in the art, certain aspects of the disclosed subject matter may be embodied as a method, system (e.g., a work vehicle control system included in a work vehicle), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that may contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

The various modules and applications may be configured to include application program interfaces (APIs) or other dedicated sections/groups of software and scripting language of functions that perform the sub tasks of the programmed processor(s). These modules may reside in a single processor, have corresponding dedicated processors, or a combination thereof. Non-limiting examples of software and scripting languages which may be executed by the programmed processor(s) include CTM, C++, C#, Perl, PHP, Python, AppleScript, Cold Fusion, Ruby, SQL, HTML, and JAVA. In many embodiments, computer readable memory embodies Python based scripting language/instructions which when read by the programmed processors causes the programmed processors to execute dedicated programing functions to perform the processing steps of the embodiments.

Aspects of certain embodiments are described herein may be described with reference to flowchart illustrations and/or block diagrams of methods, apparatus (systems) and computer program products according to embodiments of the invention. It will be understood that each block of any such flowchart illustrations and/or block diagrams, and combinations of blocks in such flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block (or otherwise described herein) may occur out of the order noted in the figures. For example, two blocks shown in succession (or two operations described in succession) may, in fact, be executed substantially concurrently, or the blocks (or operations) may sometimes be executed in the reverse order, depending upon the functionality involved. It will also be noted that each block of any block diagram and/or flowchart illustration, and combinations of blocks in any block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A sensor apparatus for a grain loss monitoring system associated with an agricultural material, comprising:
    a housing with a plurality of walls forming an interior, the plurality of walls comprising at least one first wall including a transparent panel with an inner surface facing the interior and an outer surface facing opposite the inner surface;
    at least one acoustic sensor arranged within the interior of the housing and configured to collect an acoustic data stream of vibrations associated with the agricultural material striking the transparent panel; and
    at least one optical sensor arranged within the interior of the housing and configured to collect an image data stream of images of the agricultural material through the transparent panel;
    wherein the at least one acoustic sensor is configured to provide the acoustic data stream from which is derived an acoustic-based grain count and the at least one optical sensor is configured to provide the image data stream from which is derived an image-based grain count; and
    wherein the acoustic-based grain count is cross-correlated with the image-based grain count within a time window to determine a verified grain count.

2. The sensor apparatus of claim 1, wherein the at least one acoustic sensor is a piezoelectric device that captures time varying voltage amplitudes as the acoustic data stream.

3. The sensor apparatus of claim 2, wherein the piezoelectric device is mounted on the inner surface of the first wall.

4. The sensor apparatus of claim 1, wherein the at least one optical sensor is a camera configured to capture a series of image frames as the image data stream.

5. The sensor apparatus of claim 4, wherein the at least one optical sensor includes at least two cameras, each configured to capture a series of image frames within a field of view as the image data stream.

6. The sensor apparatus of claim 1, further comprising at least one lighting array arranged within the interior of the housing.

7. The sensor apparatus of claim 6, wherein the plurality of walls includes at least a first side wall and a second side wall, and the at least one lighting array includes a first lighting array mounted on the first side wall within the enclosure and a second lighting array mounted on the second side wall within the enclosure.

8. A grain loss monitoring system for a harvesting machine configured to process agricultural material, comprising:
  a sensor apparatus, comprising:
    a housing with a plurality of walls forming an interior, the plurality of walls comprising at least one first wall including a transparent panel with an inner surface facing the interior and an outer surface facing opposite the inner surface;
    at least one acoustic sensor arranged within the interior of the housing and configured to collect an acoustic data stream associated with the agricultural material striking the transparent panel; and
    at least one optical sensor arranged within the interior of the housing and configured to collect an image data stream of images of the agricultural material through the transparent panel; and
  a controller coupled to receive the image data stream and the acoustic data stream, the controller configured to:
    determine an acoustic-based grain count from the acoustic data stream;
    determine an image-based grain count from the optical data stream;
    cross-correlate the acoustic-based grain count with the image-based grain count within a time window; and
    calculate a verified grain count based on the acoustic-based grain count and the image-based grain count.

9. The grain loss monitoring system of claim 8, further comprising a display device coupled to the controller and configured to display the verified grain count.

10. The grain loss monitoring system of claim 8, wherein the controller is configured to determine the acoustic-based grain count at least partially simultaneously as the image-based grain count.

11. The grain loss monitoring system of claim 8, wherein the controller is configured to calculate the acoustic-based grain count as the verified grain count when the acoustic-based grain count is less than the image-based grain count and to calculate the image-based grain count as the verified grain count when the image-based grain count is less than the acoustic-based grain count.

12. The grain loss monitoring system of claim 8, wherein the controller is further configured to, in order to determine the image-based grain count,
  identify an image frame from the image data stream and the time window associated with the image frame;
  calculate the image-based grain count from the image frame; and
  store the image-based grain count and the time window in an image-based data server.

13. A grain loss monitoring system for a harvesting machine configured to process agricultural material, comprising:
  a sensor apparatus, comprising:
    a housing with a plurality of walls forming an interior, the plurality of walls comprising at least one first wall including a transparent panel with an inner surface facing the interior and an outer surface facing opposite the inner surface;
    at least one acoustic sensor arranged within the interior of the housing and configured to collect an acoustic data stream associated with the agricultural material striking the transparent panel; and
    at least one optical sensor arranged within the interior of the housing and configured to collect an image data stream of images of the agricultural material through the transparent panel; and
  a controller coupled to receive the image data stream and the acoustic data stream, the controller configured to determine an acoustic-based grain count from the acoustic data stream, to determine an image-based grain count from the optical data stream, and to calculate a verified grain count based on the acoustic-based grain count and the image-based grain count, wherein the controller is further configured to calculate the image-based grain count from an image frame of the image data stream for which the controller is configured to:
    remove background noise from the image frame to generate a blurred image frame;
    create a binarized image from the blurred image frame;
    generate a list of contours from the binarized image;
    apply down selection to the list of contours based on shape parameters or color parameters or both to result in a list of selected contours;
    generate a contour count from the list of selected contours; and
    apply an extrapolation to the contour count to generate the image-based grain count.

14. The grain loss monitoring system of claim 13, wherein the controller is further configured to, in order to apply the extrapolation to the contour count,
  apply a first set of parameters to contour count, wherein the first set of parameters includes at least one of a maximum distance to observable grain proximate to the at least one optical sensor, a frame rate associated the at least one optical sensor, an exposure time associated with the at least one optical sensor, and a grain speed.

15. The grain loss monitoring system of claim 13, wherein the controller is further configured to, in order to determine the acoustic-based grain count,
  determine an acoustic waveform segment from the acoustic data stream;
  remove noise from the acoustic waveform segment to generate a resultant waveform segment;
  transform the resultant waveform segment with a Short-Time Fourier transformation to generate transformed segments;
  determine a local energy of each transformed segment to result in an energy envelope;
  smooth the energy envelope to result in a smoothed energy envelope;
  normalize the smoothed energy envelope to result in a normalized smoothed energy envelope; and
  identify and count strike indicative peak events from the normalized smoothed energy envelope to result in the acoustic-based grain count.

16. The grain loss monitoring system of claim 15, wherein the controller is further configured to, in order to identify and count the strike indicative peak events,
  apply a low pass filter to the normalized smoothed energy envelope to result in a filtered normalized smoothed energy envelope;

generate a dead-band threshold range of upper and lower limits using the filtered normalized smoothed energy envelope;

compare the dead-band threshold range to the normalized smoothed energy envelope; and identify and count the strike indicative peak events for the filtered normalized smoothed energy envelope relative to the dead-band threshold range to result in the acoustic-based grain count.

17. The grain loss monitoring system of claim 8, wherein the at least one acoustic sensor is a piezoelectric device mounted on the inner surface of the first wall that captures time varying voltage amplitudes as the acoustic data stream.

18. The grain loss monitoring system of claim 8, wherein the at least one optical sensor includes at least two cameras, each configured to capture a series of image frames within a field of view.

19. The grain loss monitoring system of claim 8, wherein the at least one optical sensor includes at least one lighting array arranged within the inner enclosure of the housing.

20. The grain loss monitoring system of claim 8, wherein the sensor apparatus is a separator loss sensor apparatus or a cleaning shoe loss sensor apparatus.

* * * * *